United States Patent [19]
Anderson

[11] Patent Number: 5,289,386
[45] Date of Patent: Feb. 22, 1994

[54] METHOD AND APPARATUS FOR STORING SCINTILLATION PULSE HEIGHT DATA

[75] Inventor: Philip D. Anderson, Fullerton, Calif.

[73] Assignee: Beckman Instruments, Inc., Fullerton, Calif.

[21] Appl. No.: 401,348

[22] Filed: Aug. 31, 1989

[51] Int. Cl.$^5$ .............................................. G06F 15/20
[52] U.S. Cl. ..................................... 364/498; 250/369
[58] Field of Search .................. 250/363.07, 367, 368, 250/369; 364/498; 377/13

[56] References Cited

U.S. PATENT DOCUMENTS

| | | | |
|---|---|---|---|
| 4,002,909 | 1/1977 | Packard et al. | 250/369 X |
| 4,016,418 | 4/1977 | Horrocks et al. | 250/369 X |
| 4,029,401 | 6/1977 | Nather | 250/369 X |
| 4,049,966 | 9/1977 | Luitwieler, Jr. | 250/369 |
| 4,058,728 | 11/1977 | Nickles | 250/363.07 |
| 4,075,480 | 2/1978 | Horrocks | 250/328 |
| 4,151,412 | 4/1979 | Aime et al. | 250/369 X |
| 4,661,909 | 4/1987 | Kumazawa et al. | 250/363.07 X |
| 4,866,615 | 9/1989 | Ichihara | 364/413.24 |

OTHER PUBLICATIONS

Horrocks, Donald L.; "Liquid Scintillation Counters and Multiplier Phototubes"; Chapter IV, *Applications of Liquid Scintillation Counting* (1974) pp. 69–89.

Horrocks, Donald L.; "Quench Correction Methods", Chapter X, *Applications of Liquid Scintillation Counting* (1974) pp. 208–226.

*Primary Examiner*—Edward R. Cosimano
*Attorney, Agent, or Firm*—William H. May; P. R. Harder; Wen Liu

[57] ABSTRACT

A method and apparatus for generating scintillation pulse height distribution spectrum with respect to a square root representation of pulse height. Pulse height data are pooled into variable size windows of which the average energy level is approximately proportional to the square of the corresponding window number. The square root representation is accomplished by choosing the size of each window according to an arithmetic series of a constant difference between windows.

14 Claims, 3 Drawing Sheets

METHOD AND APPARATUS FOR STORING SCINTILLATION PULSE HEIGHT DATA

BACKGROUND OF THE INVENTION

1. Field of the Invention

The present invention relates generally to the field of scintillation counting and more particularly to a method and apparatus for efficient storage of pulse height data acquired by a scintillation counter.

2. Description of Related Art

Scintillation counting techniques are well known for measuring the radioactivity of samples containing radionuclides which permits identification of the samples. For example, in liquid scintillation, a radioactive sample, an alpha, beta or gamma emitter, is dissolved or suspended in a liquid scintillation medium. The liquid scintillation medium comprises a solvent or solvents and a solute or solutes present in a few percent by weight of the liquid scintillation medium. The radioactive sample begins to disintegrate within the liquid scintillation medium. It is theorized that most of dynamic energy from the nuclear disintegrations of the radioactive sample is absorbed by the solvent and then transferred to the solute which emits photons as visible light flashes or scintillations. The amount of photons emitted from a scintillation is proportional to the energy of the corresponding nuclear disintegration and is characteristic of the sample.

A scintillation counter measures the relative intensities of scintillations occurring within a scintillation mixture. Typically, scintillations occurring within the scintillation mixture are detected by suitable photodetector which produces output pulses having pulse heights proportional to the number of photons generated by the corresponding scintillations. The scintillation counter counts the pulse in a plurality of pulse height channels or windows having upper and lower pulse height limits that together span a predetermined range of pulse heights. The counts accumulated in the windows may be plotted with respect to corresponding pulse heights to provide a pulse height spectrum representing the energy spectrum of the nuclear radiation emitted by the radioactive sample.

Prior to the development of low cost multichannel analyzers such as the modern analog-to-digital integrated circuit, the analysis of scintillation pulse height data was done by using several discrete counting windows or channels, with either linear or logarithmic amplification. See Horrocks, D. L. "Applications of Liquid Scintillation Counting" (1974), Chapter IV, Academic Press. An advantage of using logarithmic amplification was that only one amplifier was required to process full range of the pulse height data. In addition, discussions of pulse height spectra were often facilitated when they were plotted versus the logarithm of energy full range, since tritium H3 has a maximum energy of only 18 KeV compared to P32, which has a maximum energy of 1.7 MeV.

Since the introduction of now-familiar analog-to-digital converters, multichannel analysis of pulse height data is possible, instead of being limited to a few discrete counting windows.

It is a well known concern in the scintillation counting art that materials present in the scintillation mixture can decrease the number of photons reaching the photodetector for a given nuclear disintegration. For example, the emission of photons in a liquid scintillation solution can be prevented or emitted photons can be absorbed. Furthermore, some scintillation events can be reduced to a level which is below the minimum detection level of the photomultiplier. Such effects are commonly referred to as "quenching" and in each case result in the reduction in the number of photons detectable by the photodetector. Because quenching decreases the number of photons applied to the photodetector, the result is that the number of counts per unit time detected by the photodetector for a quenched sample is decreased as compared with an otherwise identical unquenched sample. The result of quench, therefore, is to shift the pulse height spectrum of the quenched scintillation sample along the pulse height axis to lower pulse height values, and this is commonly referred to as "pulse height shift".

In order to correct for the effect of sample quench, systems have been developed for determining the degree of quench in a sample and for adjusting the relative position of the pulse height spectrum and the window in which samples scintillations are measured by an amount corresponding to the degree of sample quench. Such automatic quench compensation methods, in effect, operate to re-establish the correct relative position of the pulse height spectrum in the measuring window. Measurement of the degree of sample quench for use in quench compensation methods can be performed by any of numerous known techniques. See Horrocks, supra at Chapter X. A highly desirable quench determination method, termed the "H-number technique", is disclosed in U.S. Pat. No. 4,075,480 to Horrocks which is assigned to the assignee of the present invention. In the H-number technique, a liquid scintillation sample is irradiated by a standard source (e.g. cesium 137) to produce a Compton scattered pulse height spectrum. The relative shift of a unique point (typically a point of inflection) on the leading edge (or Compton edge) of the Compton spectrum between the irradiated quenched sample and a similarly irradiated standard sample provides a measure of the degree of quench. Implementation of the foregoing quench correction method requires a pulse height spectrum of the standard sample be stored in the memory of a computer, at least temporarily, for later comparison with the spectrum of the quenched sample. In addition, a large number of channels must be used to obtain sufficient resolution to permit accurate identification of the point of inflection on the Compton edge. As a consequence, a large number of computer memory locations are required to store the results of the large number of measurements. Furthermore, the fact that the width of the Compton edge changes drastically with quench level means that a time consuming algorithm must be used for processing a large volume of data. In the past, logarithmic amplification results in bunching of data points at high energies, while linear amplification results in bunching of data points at low energies. The resolutions obtained in the determination of the point of inflection on the Compton edge often do not meet expectations.

SUMMARY OF THE INVENTION

The present invention is directed to a method and apparatus for combining scintillation pulse height data in a compact and efficient manner which provides improved resolution without increasing memory space. The pulse height data are pooled into variable size windows, each corresponding to a number of pulse height channels having upper and lower pulse height limits that together span a predetermined range of pulse heights. The number of channels per window is determined according to an arithmetic series of integer numbers which difference between consecutive windows is a constant. The pulse height data within the channels belonging to a window are summed to represent the number of counts for the particular window. The resulting pulse height spectrum is represented with respect to a square root scale, where the average energy level of each window is approximately proportional to the square of the corresponding window number.

DESCRIPTION OF ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

Figure 1:
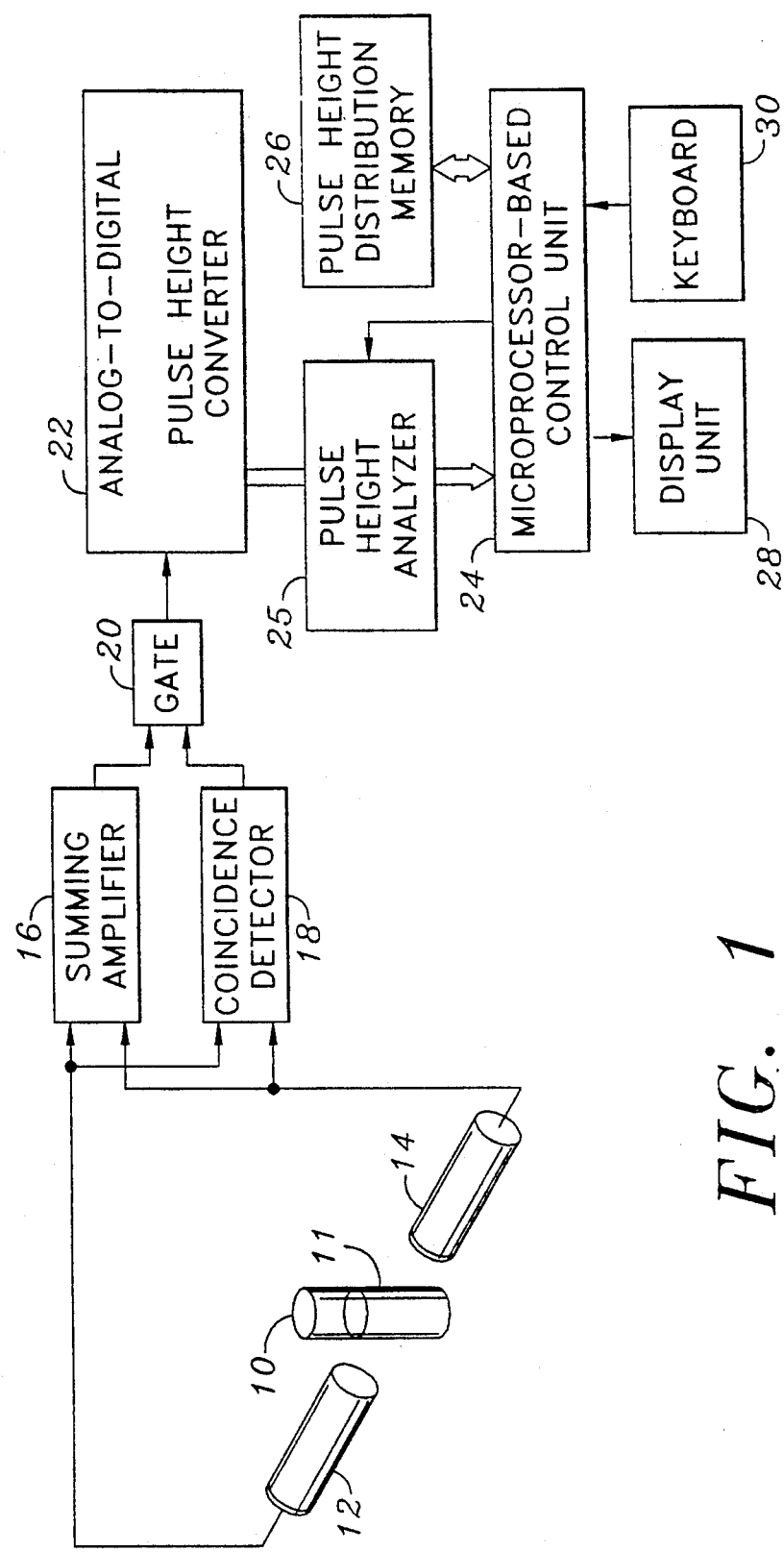
FIG. 1 is a schematic block diagram of an apparatus in accordance with one embodiment of the present invention.

With reference to FIG. 1, an apparatus in accordance with one embodiment of the present invention is shown therein in functional block diagram form. The apparatus of FIG. 1 is adapted to receive a vial 10 within a radiation shielded counting chamber (not shown). The vial 10 holds a liquid scintillation solution 11 comprising a radioactive sample and a conventional liquid scintillation medium. (Although the present invention is described with reference to liquid scintillation medium, it should be appreciated that solid scintillation medium can be used with the present invention.) A pair of photomultiplier tubes 12 and 14 are arranged to detect and convert scintillations in the solution into output voltage pulses. Each such pulse having an amplitude proportional to the number of photons produced by the corresponding detected scintillation. The photons are simultaneously, or nearly simultaneously detected by the photomultiplier tubes 12 and 14 and converted into measureable electrical pulses for output. The apparatus further includes a summing amplifier 16, a coincidence detector 18, a coincidence gate 20, an analog-to-digital converter 22, a pulse height analyzer 23, a microprocessor-based control unit 24, memory 26, display 28 and keyboard input 30 devices.

The output pulses from the photomultiplier tubes 12 and 14 are transmitted to the summing amplifier 16, the output of the amplifier 16 being fed to the coincidence gate 20, the output of which is fed in turn to the analog-to-digital pulse height converter 22. The output pulses from the photomultiplier tubes 12 and 14 are also transmitted to the coincidence detector 18, which provides an output only if the input pulses from the tubes are essentially in coincidence. As used herein, the expression "essentially in coincidence" refers to a pair of pulses, one from each of the photomultiplier tubes, occurring within a resolving time interval. The coincidence signal from the coincidence detector 18 and the output from the summing amplifier 16 are applied to the coincidence gate 20 which functions to produce an output to the analog-to-digital converter 22 only when both signals are in the same selected condition.

The output from the analog-to-digital converter 22 is applied to the pulse height analyzer which sorts the pulses into windows of selected energy level ranges. The controller unit 24 controls the pulse height analyzer 20 to provide a count of pulses falling within each window. More particularly, the control unit 24 and pulse height analyzer 23 compare the value of the digital output from the analog-to-digital converter 22 to a plurality of predetermined values which define a plurality of energy ranges or windows that together span a predetermined pulse height range. According to the value represented by the digital output from the converter 22, the analyzer 23 determines which window the digital value falls within and accordingly increments one corresponding storage location within the pulse height distribution storage memory 26. The pulse height distribution storage memory 26 includes a plurality of storage locations corresponding to the number of windows established by the analyzer 23. As the liquid scintillation counting process is performed, the values stored in the various storage locations within the storage memory 26 together represent a pulse height distribution curve (see FIG. 4). The storage memory 26 is accessible to and controlled by the microprocessor within the control unit 24, each storage location within such storage memory 26 being cleared or reset prior to the start of a liquid scintillation counting procedure. The display unit 28 such as a conventional cathode ray tube can periodically display the count rate derived in a particular window or may periodically display a curve graphically showing the pulse height distribution spectrum. Alternatively, at the end of some predetermined counting period, the collected counts in the storage locations 26 may be read by the control unit 24 and displayed as a pulse height spectrum on the display unit 28.

In accordance with the present invention, the energy ranges or window sizes are different from each other and are predetermined by the pulse height analyzers according to a square root relationship in which the mean energy within a particular window is proportional to the square root of the number of that window. It has been found that such a relationship is satisfied when the widths of the windows, i.e. the number of equal size channels for the respective windows, follow an arithmetic series in which the difference in number of channels for consecutive windows is an integer constant.

The mathematical analysis is shown below.

Let $N$ = total number of windows $n = 1, 2, 3, \text{---}, N$, the consecutive numbers of the windows $C_n$ = number of channels in the nth window $\delta C$ = difference in number of channels between consecutive windows (a constant)

$E_n$ = upper limit of energy level of nth window $\bar{E}_n$ = mean energy level of the nth window $\delta E$ = energy interval per channel (a constant)

Figure 2:
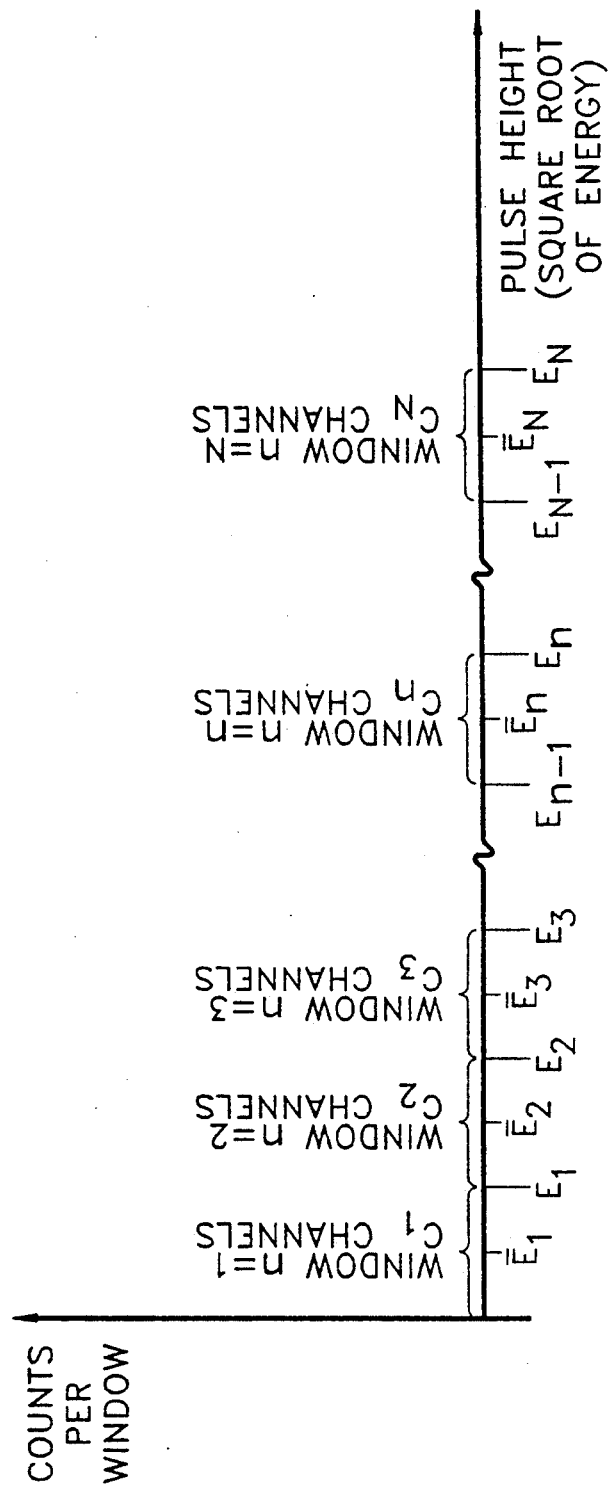
FIG. 2 is a schematic representation of the pulse height windows in accordance with one embodiment of the present invention.

FIG. 2 depicts a schematic illustration of the windows of energy (pulse height) levels represented on a square root scale.

$C_n$ follows an arithmetic series having difference $\delta C$. The number of channels in the nth window is given by:

$$C_n = C_l + (n-1)\delta C \quad (1)$$

and the total number of channels in the first n windows is given by:

$$\sum_{i=1}^{n} C_i = nC_1 + \tfrac{1}{2} n(n-1)\delta c \quad (2)$$

It follows that:

$$E_n = \delta E \sum_{i=1}^{n} C_i \quad (3)$$

$$\bar{E}_n = (E_n + E_{n-1})/2 \quad (4)$$

$$= \frac{\delta E}{2}\left(\sum_{i=1}^{n} C_i + \sum_{i=1}^{n-1} C_i\right)$$

Substituting equation (2) into (4) and simplifying gives:

$$\bar{E}_n = \frac{\delta E}{2}[(n^2 - 2n + 1)\delta C + (2n-1)C_1] \quad (5)$$

It can be seen that when n is large, $\bar{E}_n$ can be expressed approximately as:

$$\bar{E}_n = An^2 + B \quad (6)$$

where A and B are constants.

Thus, it can be said the average energy level in window n is proportional to the square of the window number and can be expressed approximately as:

$$\bar{E}_n \alpha n^2 \quad (7)$$

or $n \alpha \sqrt{\bar{E}_n}$ (8)

For the situation where $\delta C = C_l$, it will be seen that constant $B=0$ in equation (6) and the relationships set forth in equations (7) and (8) will be exact.

The constants $\delta E$ and $\delta C$ are chosen according to the expected full range values of pulse height and the desired resolution. The maximum number of windows is dependent on $\delta C$ and the number of pulse height distribution memory locations available. Referring to equation (5), constants A and B are dependent on $\delta E$, $\delta C$ and $C_l$.

Figure 3:
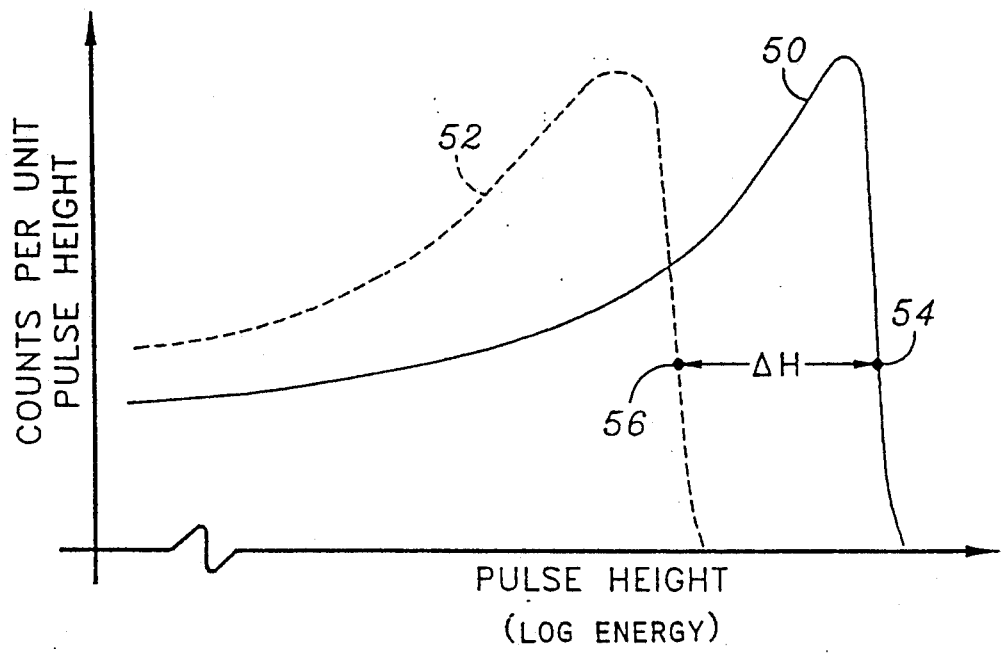
FIG. 3 is a graph depicting typical Compton pulse height spectrums represented on a logarithmic scale.
Figure 4:
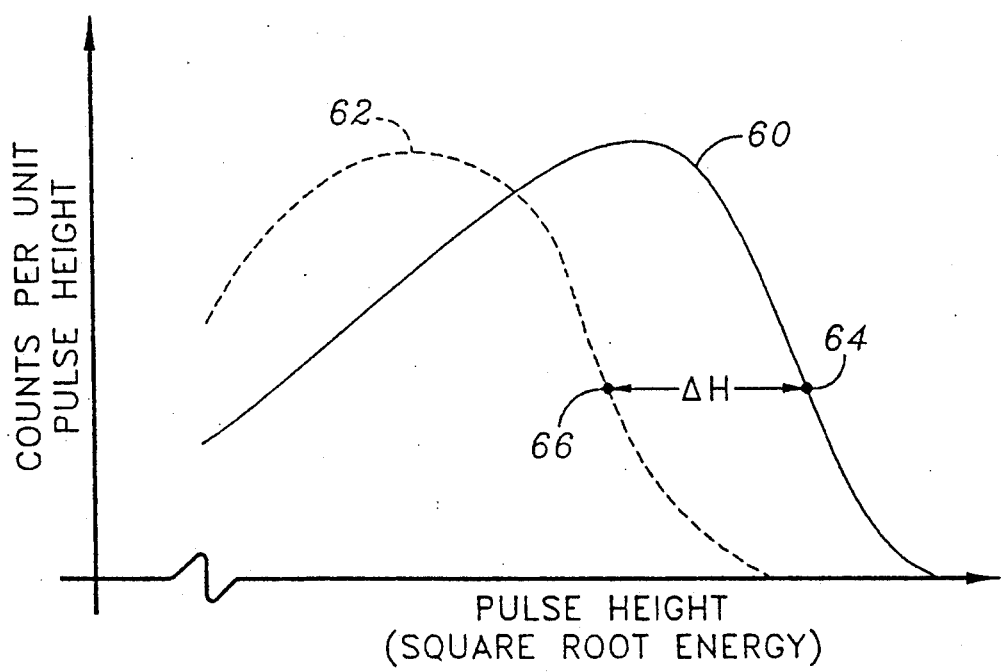
FIG. 4 is a graph depicting typical pulse height spectrums represented on a square root scale in accordance with the present invention.

Referring to FIGS. 3 and 4, it will be appreciated that quench determination by the H-number technique (see U.S. Pat. No. 4,075,480 to Horrocks) can be computed more rapidly and accurately using variable size windows in accordance with the present invention. The distribution of pulse heights along a square root scale which results in higher resolution at the high energy end, as compared to a logarithmic scale. More particularly, gamma ray interaction with the scintillation solution produces Compton scattering of electrons having an unquenched Compton scattered electron pulse height distribution spectrum 50 as shown in FIG. 3. The Compton scattered electrons are affected by quenching such that the resulting quenched Compton scattered electron pulse height distribution spectrum 52 is shifted to lower pulse height levels. The H-number is determined as the difference $\Delta H$ in pulse height values between the points of inflections 54 and 56 on the curves, which is indicative of the degree of quench in the scintillation solution. In the past, it was difficult to determine from a logarithmic representation of the pulse height spectrum the points of inflections 54 and 56 because of the poor resolution at the high energy end of the spectrum. Similarly, (not shown by the figures) if the pulse height spectrum is represented on a linear scale, there was not enough resolution at the low energy end of the pulse height spectrum. Consequently, time consuming algorithms were developed to process the pulse height data in an effort to determined the points of inflections. The accuracy of such algorithms often do not meet expectations.

Referring to FIG. 4, a square root representation of the pulse height spectrum increases the resolution at the high energy end. Unlike the logarithmic representation, bunching of data points at the high energy end can be avoided. The S-shaped profile of the spectrums 60 and 62 are better defined as a result. Accordingly, the points of inflections 64 and 66 can be located more accurately for determining the H-number. The square root representation still provides better resolution at the low energy end as compared to a linear representation. Thus, by using a square root representation, better resolution can be achieved at both ends of the full range pulse height spectrum. The square root representation can be viewed as an intermediate scale between the logarithmic and linear scales. From a statistical consideration but without going into a lengthy analysis, which is not essential to the practice of the present invention, the present inventor found that the square root representation conforms to statistical error theories concerning counting efficiency which involves a probability distribution of the detected occurrences of pulse heights that are triggered by only a fraction of the total photons produced by the scintillation. The standard deviation of the probability distribution is proportional to the square root of the number of photons or energy expected. Thus, by utilizing a square root representation in accordance with the present invention, the pulse height distribution is represented on a "linear" scale with respect to standard deviations involving square roots.

In the past, in order to increase the resolution at the ends of the pulse height spectrum, the number of pulse height windows must be increased which accordingly increases the number of memory storage locations and data processing time. By utilizing a square root representation of pulse height spectrum according to the present invention, the resolution of the pulse height spectrum is increased as a result of more efficient use of available memory storage locations. Real time processing can be performed more expediently even with increased resolution since actual number of memory locations that have to be accessed have not been increased.

While the invention has been described with respect to the illustrated embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

I claim:

1. A method of analyzing scintillations comprising the steps of:

exposing a sample in a scintillation counter to a scintillation medium thereby emitting scintillations, detecting the scintillations and producing scintillation pulse height data, the pulse height data representing energy levels of the scintillations;

choosing a plurality of data windows each of a different size corresponding to a range of pulse heights which correspond to a range of energy levels, wherein the sizes of consecutive data windows follow an arithmetic series; and pooling the pulse height data into the plurality of data windows to obtain a count of the number of occurrences of pulse heights within each data window.

2. A method as in claim 1 wherein each of the windows is made up of a number of channels of equal size corresponding to an interval of pulse heights which corresponds to an interval of energy levels, and the size of each window is chosen such that the number of channels in the consecutive windows follows an arithmetic series.

3. A method as in claim 2 wherein the average energy level of the respective window is approximately proportional to the square of the respective number of the respective window.

4. A method as in claim 3 wherein the average energy level is related to the window number in accordance with the approximation:

$$\overline{E}_n = An^2 + B$$

where:

$n = 1, 2, 3, \text{---}, N$, the consecutive numbers of the windows, $\overline{E}_n$ = mean energy level of the nth window, $A$ = a constant dependent on the energy interval per channel, and the difference in number of channels between consecutive windows, $B$ = a constant dependent on the energy interval per channel, the difference in number of channels between consecutive windows, and the number of channels in the first window.

5. A method as in claim 3 wherein the average energy level is related to the window number in accordance with the approximation:

$$\overline{E}_n \alpha n^2$$

where:

$n = 1, 2, 3, \text{---}, N$, the consecutive numbers of the windows, $\overline{E}_n$ = mean energy level of the nth window.

6. A method of analyzing scintillations comprising the steps of:

exposing a sample in a scintillation counter to a scintillation medium thereby emitting scintillations, detecting the scintillation and producing scintillation pulse height data, the pulse height data representing energy levels of the scintillations;

choosing a plurality of data windows each of a different size corresponding to a range of pulse heights which correspond to a range of energy levels, wherein the average energy level of the respective window is approximately proportional to the square of the respective number of the respective window; and pooling the pulse height data into the plurality of data windows to obtain a count of the number of occurrences of pulse heights within each data window.

7. A method as in claim 6 wherein the sizes of consecutive data windows follow an arithmetic series.

8. An apparatus for analyzing scintillations comprising:

a scintillation counter which comprises means for exposing a sample to a scintillation medium thereby emitting scintillations, and means for detecting the scintillations and producing scintillation pulse height data representing energy levels of the scintillations;

means for choosing a plurality of data windows each of a different size corresponding to a range of pulse heights which corresponds to a range of energy levels, wherein the sizes of consecutive data windows follow an arithmetic series; and means for pooling the pulse height data into the plurality of data windows to obtain a count of the number of occurrences of pulse heights within each data window.

9. A method as in claim 8 wherein each of the windows is made up of a number of channels of equal size corresponding to an interval of pulse heights which corresponds to an interval of energy levels, and the size of each window is chosen such that the number of channels in the consecutive windows follows an arithmetic series.

10. An apparatus as in claim 9 wherein the average energy level of the respective window is approximately proportional to the square of the respective number of the respective window.

11. An apparatus as in claim 10 wherein the average energy level is related to the window number in accordance with the approximation:

$$\overline{E}_n = An^2 + B$$

where:

$n = 1, 2, 3, \text{---}, N$, the consecutive numbers of the windows, $\overline{E}_n$ = mean energy level of the nth window, $A$ = a constant dependent on the energy interval per channel, and the difference in number of channels between consecutive windows, $B$ = a constant dependent on the energy interval per channel, the difference in number of channels between consecutive windows, and the number of channels in the first window.

12. An apparatus as in claim 10 wherein the average energy level is related to the window number in accordance with the approximation:

$$\overline{E}_n \alpha n^2$$

where:

$n = 1, 2, 3, \text{---}, N$, the consecutive numbers of the windows, $\overline{E}_n$ = mean energy level of the nth window.

13. An apparatus for analyzing scintillations comprising:

a scintillation counter which comprises means for exposing a sample to a scintillation medium thereby emitting scintillations, and means for detecting the scintillations and producing scintillation pulse height data representing energy levels of the scintillations;

means for choosing a plurality of data windows each of a different size corresponding to a range of pulse heights which corresponds to a range of energy levels, wherein the average energy level of the respective window is approximately proportional to the square of the respective number of the respective window; and means for pooling the pulse height data into the plurality of data windows to obtain a count of the number of occurrences of pulse heights within each data window.

14. An apparatus as in claim 12 the sizes of consecutive data windows follow an arithmetic series.

* * * * *